Sept. 16, 1958   E. B. FREMON   2,852,590
INTERNAL COMBUSTION ENGINE IGNITION STRUCTURE
Filed Jan. 14, 1954   2 Sheets-Sheet 1

INVENTOR.
Edward B Fremon
BY Rodney Bedell
atty.

Sept. 16, 1958   E. B. FREMON   2,852,590
INTERNAL COMBUSTION ENGINE IGNITION STRUCTURE
Filed Jan. 14, 1954   2 Sheets-Sheet 2
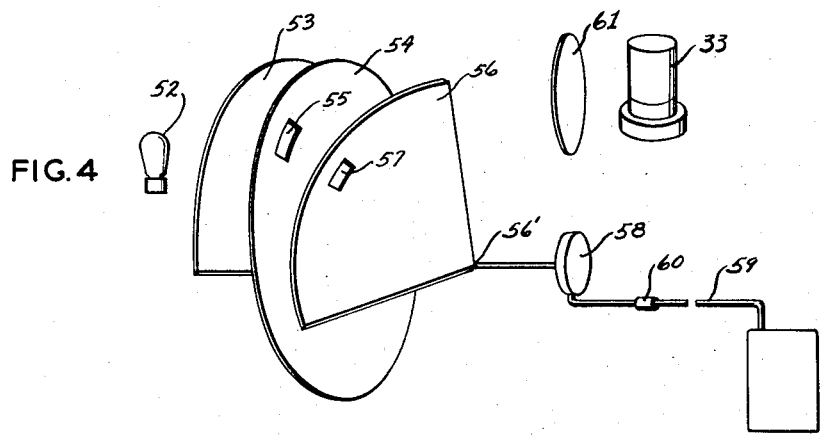
FIG. 4
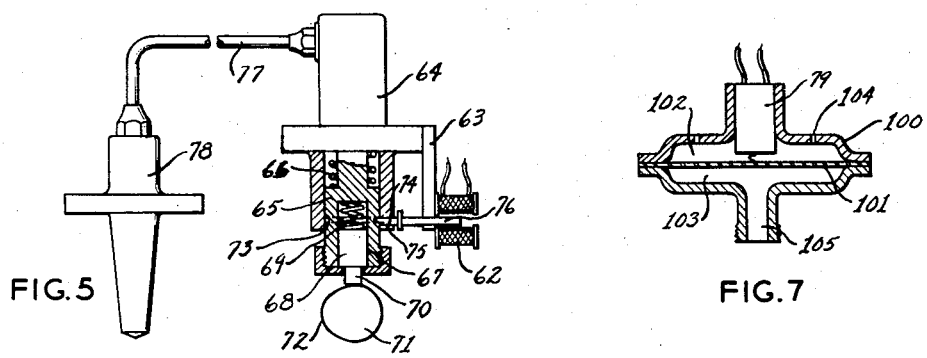
FIG. 5
FIG. 7
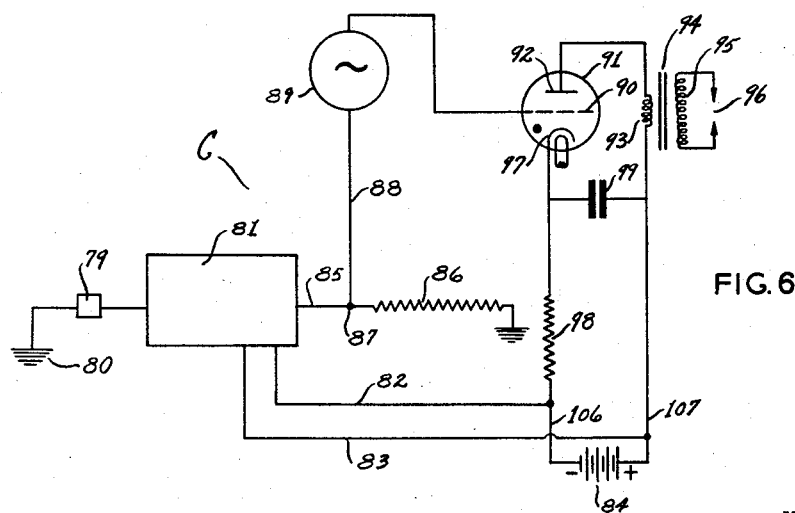
FIG. 6
INVENTOR.
Edward B. Fremon
BY
Rodney Bedell
atty.

United States Patent Office 2,852,590
Patented Sept. 16, 1958

2,852,590

INTERNAL COMBUSTION ENGINE IGNITION STRUCTURE

Edward B. Fremon, St. Louis, Mo.

Application January 14, 1954, Serial No. 403,961

18 Claims. (Cl. 123—148)

This invention relates in general to timing the firing of explosive charges in the cylinders of internal combustion engines and particularly in such a manner as to prevent excessive pressures. The term "firing" as used herein is inclusive of spark ignition and oil or gasoline injection ignition.

In the usual internal combustion engine, the timing of the firing is dependent upon engine speed. As the engine speed increases, the spark or fuel injection will be advanced, that is, occur progressively earlier in the compression stroke so that there will be sufficient time for efficient combustion to produce maximum pressure on the piston on the downward or power stroke.

In current gasoline engines of this type, the control of the instant of firing is usually accomplished by two automatic devices: a speed control using a flyball governor in the distributor head and a vacuum control operated from the intake manifold. With such control, a point is often reached at heavy engine loads wherein the point of firing is overly advanced and combustion is substantially complete prior to the arrival of the piston at the upper end of its compression stroke. Under this condition, so-called "spark knock" will occur since excessive firing pressures will result from the compression of the burning gas, by the piston, as it moves upwardly. Damage to piston rings, cylinder walls, and bearings will also be occasioned by these excessive firing pressures. If, to prevent this undesirable development under heavy engine loads, an ignition spark is retarded, that is, generated relatively late in the compression stroke, the efficiency of the engine under light loads may be materially reduced. A similar problem exists with the substantially simultaneous injection and firing of fuel in diesel engines, although such engines do not have separately controlled ignition devices to initiate the firing. The problem also exists in gas (not gasoline) engines or dual fuel engines in which an oil injection fires the main fuel charge of gas.

It is desirable that a system be provided for internal combustion engines of all types, whether gasoline-fueled, gas-fueled, diesel, or dual-fueled, which will control the firing under heavy and light engine loads, whereby maximum useful pressure will result without danger of knocking and the consequent ill effects thereof.

Accordingly, an object of this invention is to provide a system for incorporation in all types of internal combustion engines, wherein the cyclic point of firing is controlled by preceding firing pressure or pressures developed in the cylinder combustion chambers.

Another object of this invention is to provide a system of the character stated embodying means for determining average cylinder firing pressure and utilizing same for determining the instant of firing a successive fuel charge so that under heavy engine load, with resulting high pressure, a retarded firing will be caused and under light load a corresponding firing advance will be effected.

Another object is to provide a system of the stated character which, in gasoline or gas engines, obviates the use of breaker points and the difficulties arising therefrom.

Another object is to provide an ignition control system which incorporates a member generative of electric current responsive to average cylinder firing pressures and a switch-forming electronic device operated thereby.

A further object of this invention is to provide such a system which incorporates a thyratron or similar electronic switch, the closing of which is controlled by the joint action of a light sensitive device and a source of alternating current, with means associated with said light sensitive device for activating same in inverse relation to the average cylinder firing pressures.

An additional object is to provide a system of the general character described which is equally adaptable for use in Diesel engines as well as gas or gasoline engines, and in combinations thereof of gas-gasoline and Diesel fuel engines.

Another object is to provide such a system which may with equal effectiveness utilize a mechanical or an electrical device for coupling the system to the cylinder firing pressures.

These and other detailed objects are obtained by the structures illustrated in the accompanying drawings, in which:

Figure 4 is an enlarged fragmentary schematic detail of such other form of ignition control system.

Figure 5 is a fragmentary schematic presentation of another form of the present invention as adapted for use with Diesel engines.

Figure 6 is a diagrammatic presentation of a further form of the present invention.

Figure 7 is an enlarged transverse section of one type of pressure responsive member for actuating the system presented in Figure 6.

Figure 1:
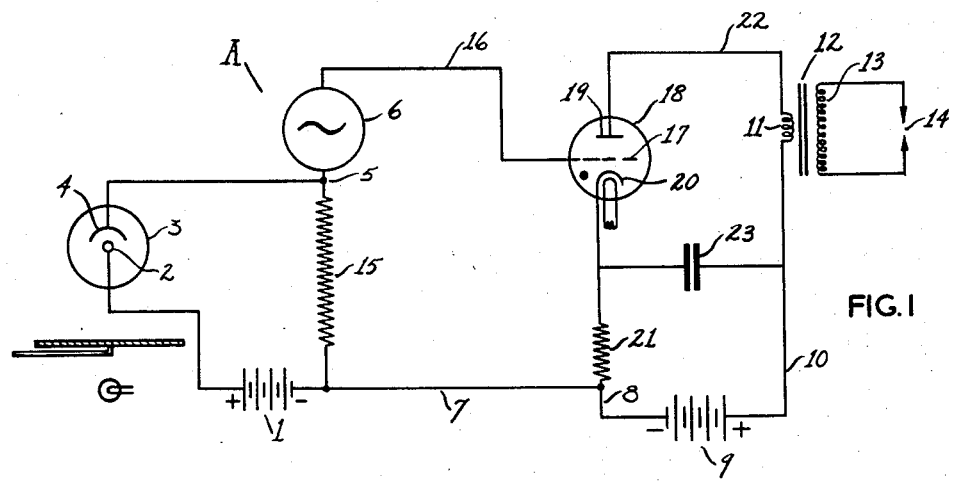
Figure 1 is a diagrammatic presentation of an ignition control system for internal combustion engines embodying the present invention.

Referring to Figure 1 of the drawings, there is disclosed an ignition system broadly denoted A, comprising a source of electricity, such as a battery 1, which at one side is connected to the anode 2 of a photoelectric cell or phototube 3 which has its cathode 4 connected, as at a point 5, to an alternating voltage generator or alternator 6. The other or negative side of the battery 1 is connected by a lead 7 to a line 8 leading from the negative side of a source of direct current indicated generally at 9, the positive side of which is connected by a line 10 to the primary windings 11 of an output transformer 12, such as an ignition coil. The secondary 13 of transformer 12 is connected to an ignition device, such as a spark plug or the like, shown diagrammatically at 14. Lead 7 is connected to alternator 6 at point 5 by a resistance 15 through which current will flow from phototube 3 upon excitation of the latter. Alternator 6 is connected by a lead 16 to the control grid 17 of a gas-filled triode or so-called thyratron 18 having an anode or plate 19 and a cathode 20, the latter being connected to line 8 and lead 7 through a resistance 21. Anode 19 of thyratron 18 is connected by a lead 22 to primary 11 of transformer 12 and connected from line 10 to cathode 20 of thyratron 18 is a condenser 23.

Alternator 6 is operatively engaged to the engine crank shaft whereby for each revolution of the engine, a complete cycle of alternating current is impressed upon control grid 17. Alternator 6 is adjusted in desired phase relation to the crank shaft so that, as in two-stroke cycle engines, a negative voltage will be impressed on grid 17 during the piston intake stroke to prevent establishment of current in thyratron 18, and a positive bias will be provided on the compression stroke, whereby the thyratron will "fire" or be conductive. From the foregoing it is seen that thyratron 18 is intermittently "closed." It is obvious ignition system A could be easily adapted for four-stroke cycle engines, as by suitable gearing.

Thyratron 18 will function as a switch between condenser 23 and transformer 12. When thyratron 18 is in a non-conductive or "switch-open" state, that is, wherein the negative bias of grid 17 prevents electron flow from cathode 20, condenser 23 will be charged from direct current source 9. Through operation of alternator 6, grid 17 will be cyclically rendered positive with respect to cathode 20 to permit a plate current to be established in thyratron 18, which will then be in a conductive or "switch-closed" state and condenser 23 will discharge therethrough for energization of transformer primary 11. A voltage will be induced thereby in secondary 13 with a discharge resultingly effected at the ignition device 14. As condenser 23 discharges, the voltage drop across resistance 21 reduces the voltage across thyratron 18 sufficiently to return same to a non-conductive state. The flow of current in primary 11 through the impulse stored in condenser 23 is of extremely short duration, so that it is the sudden building up of flux in primary 11 which is depended upon to produce the secondary discharge, as distinguished from the heretofore practiced collapsing of electrically produced magnetic fields through the cam-actuated separation of ignition points.

Figure 2:
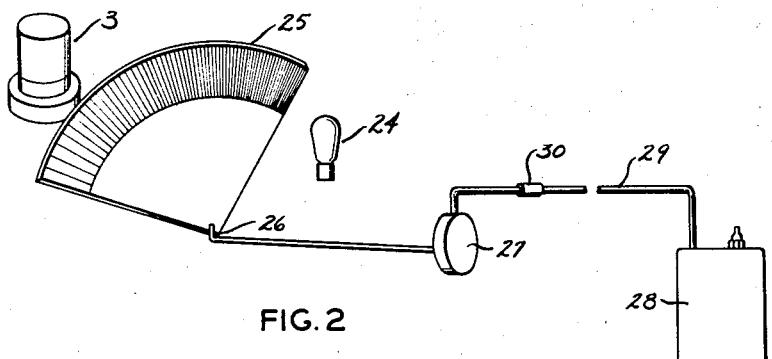
Figure 2 is an enlarged fragmentary schematic detail of the ignition control system.

The potential about which alternator 6 fluctuates will be influenced through operation of phototube 3, whereby the voltage impressed on control grid 17 will properly result from such joint action. Provided for emitting light rays for impingement upon cathode 4 of phototube 3 is a suitable light source, such as an electric bulb 24, with which may be associated reflecting and condensing means (not shown). Interposed between light source 24 and phototube 3 is a flat screen 25 (Figure 2) which is of such contour that all light reaching phototube 3 must pass through screen 25, which is rocked about a center 26, through actuation of a pressure gauge of any type, but which for purposes of example may be a manometer 27, as of the Bourdon tube type, for responsive operation to the firing pressure in an engine cylinder indicated at 28; said manometer 27 being connected thereto by a tube or conduit 29 engaged at its other end within the wall of the cylinder combustion chamber. Provided in tube 29 is a check valve 30 which permits pressure to be transmitted from the cylinder to the manometer 27, and then permits slow reduction of pressure in manometer 27 by leakage back into cylinder 28 as the pressure therein decreases subsequent to firing as the piston moves downwardly. Consequently, the pressure in manometer 27 will represent an "average" firing pressure in the cylinder over several complete cycles. Upon the firing of ignition device 14, as a spark plug, in cylinder 28, pressure will be created in the cylinder resulting from the firing or explosive forces. This pressure will be directly transmitted through tube 29 to manometer 27 and cause screen 25 to move about its center 26 through an appropriate arc and in the requisite direction. For example, if the average firing pressure is relatively low, screen 25 will move in a clockwise direction from a position corresponding to a normal firing pressure, whereas if the average firing pressure is relatively high, screen 25 will move counterclockwise from such position, the arc of movement in either case being commensurate with the change in pressure value.

Screen 25 is progressviely shaded throughout its extent so that at one end it is opaque, being completely impervious to light, with the opposite end being of maximum translucency. The particular portion of screen 25 presented in the path of light rays proceeding from light source 24 will determine the amount of light impinging on phototube 3.

Thus, with the opaque end of screen 25 in interposed position, no light will strike phototube 3, whereby the potential of alternator 6 will be unaffected and, hence, will fluctuate about its normal level. When the opposite end of screen 25 is interposed, maximum light will strike cathode 4 and induce a maximum current in cell 3. Between the end extremes of opacity and complete translucency, screen 25 is of graduated shading to permit transmission of light therethrough in inverse relation to the average cylinder firing pressure. The increase of current flowing from phototube 3 through resistance 15 to point 5 will make point 5 more positive and cause the voltage output of alternator 6 to fluctuate about a higher positive potential then the same would without aid of the phototube current. The voltage impressed on control grid 17 will thus more rapidly acquire a positive bias for triggering of thyratron 18, as the phototube current increases. At normal firing pressures, screen 25 will be presented so that its central portion is in interposed position with the point of firing occurring in relation to piston positon as determined by the rapidity with which thyratron 18 is "closed" through the potential created by alternator 6 and phototube 3 for the particular screen setting. When the average firing pressure in cylinder 28 is elevated, as the engine develops more power, screen 25 will be moved through a greater arc to present its increasingly opaque portion in the path of light rays from source 24. The positive potential at point 5 will be reduced since the current generated by phototube 3 is reduced if screen 25 is at its extreme opaque end. The requisite voltage for establishing plate current in thyratron 18 will be arrived at later in the cycle, with consequent retardation, or relative lateness in the firing of ignition device 14. Thus, as firing pressures increases, the point of firing will occur later, avoiding undesirable spark knocking.

With relatively low average firing pressures, screen 25 will pivot about its center 26 to allow increased flow of light to phototube 3 with the consequent development of an increased current through resistance 15. This action will raise the positive voltage of point 5 and cause the voltage impressed on control grid 17 to reach the required triggering potential earlier in the cycle, thus advancing the point of firing in relation to piston travel. Thus, with low firing pressures, the spark or firing point will be advanced, with maximum efficiency of the engine being provided thereby under light loads.

The particular amount or degree of advance of point of firing effected by ignition system A under any specified reduction of average firing pressure will depend upon several factors, such as the degree of rotation of screen 25, the gradation of shading in screen 25, the brilliance and type of light source, the characteristics of the photoelectric cell 3, the battery voltage and the value of the resistance. A proper balancing of these factors will produce desired point of firing for any given engine under any set of operating conditions.

It is evident that the foregoing system can be readily adapted to be utilized with multicylinder engines, four-stroke cycle engines, variable speed engines, or any combination of two or four stroke cycle, single or multi-cylinder and constant or variable speed engines.

Figure 3:
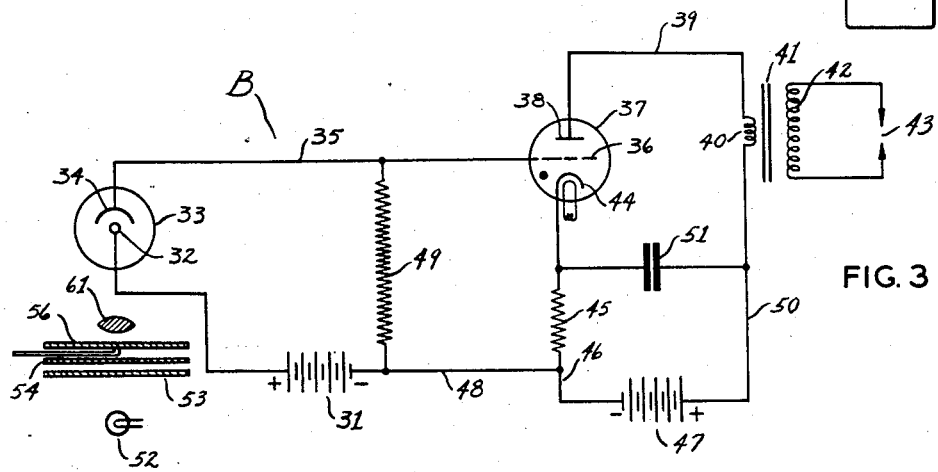
Figure 3 is a diagrammatic presentation of another form of ignition control system embodying the present invention.

Referring now to Figures 3 and 4, another form of ignition system, designated generally B, for internal combustion engines, is schematically presented comprising in circuit a battery 31, having its positive side connected to the anode 32 of a phototube 33, the cathode 34 of which is connected by a lead 35 to the control grid 36 of a thyratron 37. Thyratron 37 includes an anode or plate 38 connected by a lead 39 to the primary windings 40 of an output transformer 41, such as an ignition coil, the secondary 42 of which is connected to an ignition device, such as a spark plug, indicated at 43. Cathode 44 of thyratron 37 is connected to one end of a resistance 45, the other end of which is connected by a line 46 to the negative side of a source of direct current 47; battery 31 being connected on its negative side by a lead 48 to line 46. Connected across leads 48 and 35 is a resistance 49 through which battery 31 normally maintains grid 36 negative with respect to cathode 44 so that thyratron 37 will be "open" thereby. Leading from the positive side of direct current source 47 is a line 50 which is connected to transformer primary 40. A condenser 51 is connected from thyratron cathode 44 to line 50.

Presented for projecting light to impinge upon cathode 34 of phototube 33 is a light source 52 such as a bulb. Interposed between light source 52 and phototube 33, and adjacent light source 52, is a stationary, entirely translucent member 53 to effect diffusion of light from source 52 and thus present a relatively enlarged brightened area. Adjacent the side of screen 53 remote from light source 52 is a circular opaque disc 54, having a radially located opening 55, and being attached to the engine crank shaft or otherwise arranged to be rotated in timed relation with the engine to be ignited. Disposed in aligned relation with disc 54 is opaque screen 56 which may be of any suitable contour, being shown as of general segmental design in the drawing. Opaque screen 56 is provided with a radial opening 57 for alignment with opening 55 in disc 54. Screen 56 is adapted for rotative or rocking movement about a center 56' through actuation of a pressure gauge mechanism 58, which may be of any type, such as a manometer, and is connected to the engine cylinder by a tube 59 having a check valve 60 located thereon. Pressure gauge mechanism 58 operates in the same manner as gauge 27 in system A hereinabove described and, hence, functions to move screen 56 responsively to average cylinder firing pressures. Intermediate opaque screen 56 and phototube 33 is a condensing lens 61 for focusing such light as may pass through aligned openings 55, 57 onto phototube 33.

Opening 55 in opaque disc 54 is in proper phase relation with the engine crank shaft. For purposes of explanation, system B can be considered as incorporated in a two-cycle constant speed engine in which opaque disc 54 will effect one complete revolution during each two strokes of the piston. Therefore, the location of opening 55 at the instant of firing will be indicative of the position of the piston during the compression stroke. Thus, it would be expected that opening 55 would be approaching, but short of, top position at the firing instant since such position would correspond to top dead center for the piston.

Opaque screen 56 will be pivoted to move from a position corresponding to normal firing pressure through an arc commensurate with the variation in average firing pressure operating upon pressure gauge 58. For example, with relatively low average firing pressures, opaque screen 56 will swing counterclockwise with opening 57 therein aligning with disc opening 55 markedly in advance of the latter's arrival at its uppermost point. By such alignment of said openings, light will flow therethrough for impingement, directed by lens 61, on phototube 33 for generation of a current which will move through resistance 49 for impressing a positive bias upon control grid 36 to "trigger" thyratron 37 with resultant discharge or firing of ignition device 43. If the firing pressure in the engine cylinder is relatively elevated through higher engine load, opaque screen 56 will move in a clockwise direction so that opening 57 will align with disc opening 55 at a point nearer top dead center and, thus, a resultant retarding of the point of firing will take place.

Control grid 36 is normally biased negatively by battery 31 and during such non-conductive state condenser 51 will be charged. Upon impingement of light on phototube cathode 34 a more positive voltage will be established on grid 36 with condenser 51 discharging through tube 37 and transformer primary 40 being excited thereby for inducing a voltage in secondary 42. It is the sudden electrical impulse from condenser 51 which builds up a flux for induction of voltage in transformer 40 to effect the firing discharge.

Thus, the positionment of screen opening 57 through operation of screen 56 responsive to the average cylinder firing pressure will determine the ignition instant. With low average firing pressures, the point of firing will be advanced by relatively early alignment between said openings and with high average firing pressures the spark will be retarded.

As indicated above, system B may be readily adapted for usage with two-cycle as well as four-cycle engines, which may be of constant or variable speed and single or multi-cylinder.

Figure 5 shows an arrangement for utilizing systems A or B above described for firing in straight Diesel and dual-fuel engines, whereby the timing of fuel injection will be made responsive to average cylinder firing pressures. In this arrangement, a solenoid 62 is, in lieu of a spark plug or the like, connected to the secondary of the particular transformer 12 or 41 as the case may be, and is suitably mounted upon a bracket 63 integral with or secured to a Diesel engine fuel pump 64. Pump 64 embodies the usual piston 65, having a diametrically reduced upper end for engagement thereabout of a return spring 66. At its lower end, piston 65 is provided with an axial bore 67 for receiving a plunger 68 bearing at its upper end against a relatively heavy coil spring 69, the opposite end of which bears against the end of bore 67 for biasing plunger 68 downwardly and outwardly.

At its outer or lower end, plunger 68 is provided with a projecting cam follower 70 for engagement with a rotatably mounted operating cam 71 having a marginally projecting operating surface 72, which effects upward movement of plunger 68 in loading spring 69 when cam follower 70 rides therealong. Piston 65 is provided with a circumferential groove 73 within which projects one end of a latch arm 74 extending through an opening 75 in the pump housing, said latch arm 74 being continuous with armature 76 of solenoid 62. Fuel pump 64 is connected by a conduit 77 to a conventional Diesel engine fuel injector 78.

Upon energization of solenoid 62 through excitation of the transformer primary of the particular system, A or B, as the case may be, in response to the cylinder average firing pressure, armature 76 will be withdrawn causing release of latch 74 from locked engagement with piston 65. The latter is then freed for upward pumping movement under influence of heavy spring 69 which has been compressed by plunger 68 under the influence of cam surface 72. The timing of cam 71 is such that plunger 68 will be in full inward or raised position at the time of the most advanced injection point desired. The operating surface 72 of cam 71 is of such extent that plunger 68 will be retained in operative position at the time of the most retarded injection point desired. Therefore, variable timing of fuel injection is secured during the interval that cam surface 72 engages plunger 68, by release of latch 74 by solenoid 62, which is energized at the requisite instant by system A or B described. Spring 66 is relatively light for returning piston 65 to extended or lowered position when engagement between cam follower 70 and cam surface 72 has terminated. Thus, the feeding of the fuel in diesel and dual fuel engines may be timed in response to the average firing pressure created in the cylinders so that desired retardation or advancement of the ignition thereof can be automatically effected.

The firing pressures created in cylinders of internal combustion engines can be averaged electrically as well as mechanically. For electrical measurement of pressures various expedients may be utilized, such as a piezoelectric crystal, a strain gauge, a photoelectric cell actuated by light from a pressure-operated vane, a variable-resistance rheostat, a variable capacitor, a variable-reluctance magnetic circuit, or other related electrical pressure pick-up mechanisms for engine indicators and the like. In systems incorporating electrical pressure devices, the output therefrom is suitably amplified and then fed to a meter, such as a voltmeter or ammeter wherein the customary needle is replaced by a screen member, such as shown at 25 in system A and at 56 in system B hereinabove described, which would then be rockable by action of the meter spindle. Such a system would operate in the same manner as systems A and B with the average firing pressure in the cylinder being determinative of the timing of ignition.

A related system broadly indicated C, utilizing electric pressure pick-up means, is shown in Figures 6 and 7 and comprises a piezoelectric crystal device 79 grounded at one side, as at 80, and having its other side connected to an amplifier and integrator unit denoted generally at 81. Said unit 81 is connected by leads 82, 83 across lines 106, 107 which progress from a source of direct current indicated at 84. One side of unit 81 is connected by a lead 85 to a resistance 86 which is grounded at its other end. Taking off from lead 85 at a point designated 87 is a lead 88 to a source of alternating current or alternator 89 which is connected on its opposite side with the control grid 90 of a thyratron 91. The plate or anode 92 of thyratron 91 is connected to the primary 93 of an output transformer 94, having a secondary 95 connected to an ignition device, such as a spark plug, at 96. Lead 82 is connected to cathode 97 of thyratron 91 through a resistance 98. Line 107 is connected to primary 93 of transformer 94 and connected from line 106 to cathode 97 is a condenser 99 for discharge through thyratron 91 when the same is in a conductive or "switch-closed" state.

As shown in Figure 7, piezoelectric crystal 79 is disposed in the upper end of a housing 100 having a transversely extending flexible diaphragm 101 for dividing same into upper and lower chambers 102, 103, respectively. Upper chamber 102 is vented as at 104 and lower chamber 103 is provided with an outwardly extending tubular connection 105 for threaded engagement in the cylinder wall, whereby the interior of the combustion chamber thereof is in direct communication with lower chamber 103 so that firing pressure developed in the cylinder will act upon diaphragm 101 with commensurate flexing of the same. Piezoelectric crystal 79 serves as an electromechanical transducer, whereby the mechanical motion of diaphragm 101 subjects crystal 79 to a stress which causes electric voltage to be generated thereby. The voltage thus generated by crystal 79 will depend on the applied stress and hence correspond with the firing pressure in the cylinder. Alternator 89 is operative by rotation of the engine crank shaft and the potential about which it fluctuates will be influenced by the potential generated in crystal 79, said potential being averaged and a corresponding current caused to flow in resistance 86 by the action of amplifier 81.

Thus, the joint action of crystal 79 and its associated amplifier and alternator 89 will determine the potential impressed upon control grid 90 and thereby the instant of high tension discharge or ignition, similar to the combinative action of phototube 3 and alternator 6 in system A above described.

The systems hereinabove set forth have been described as including a thyratron having a control grid adapted to "fire" when a positive bias is impressed thereupon. It is to be understood that thyratrons adapted for triggering when the grids thereof are rendered negative can be utilized in said systems with equal facility. Additionally, it is to be recognized that with the continuous development of more powerful transistors, the same may be utilized in lieu of the thyratron in the present invention. The prospective developments in vacuum or gas-filled tubes will undoubtedly render same capable of substitution for thyratrons in the firing control systems of this invention.

Systems A and B have been described as incorporating an alternator or source of alternating current. It is obvious that such alternator might be replaced by a generator of pulses of direct current without in any way adversely affecting the sensitive operations of said systems.

The details of construction may be varied without departing from the spirit of the invention and the exclusive use of those modifications coming within the scope of the claims is contemplated.

What is claimed is:

1. In a firing control system for internal combustion engines, a primary circuit and a power source, an electronic switch, first means adapted for intermittent rhythmic operation to render said switch conductive, and second means operatively connected to said first means and adapted for actuation responsively to engine cylinder firing pressures to alter the normal rhythmic functioning of said first means in rendering said switch conductive.

2. In a firing control system for internal combustion engines, a primary circuit and a power source, a thyratron including a cathode, anode, and control grid, first means for intermittently applying a triggering bias to said control grid to render the thyratron conductive, and second means in circuit with said first means adapted for voltage generation responsively to engine cylinder firing pressures for altering the normal rhythmic functioning of said first means in impressing a triggering bias on said control grid.

3. In a firing control system for internal combustion engines, a primary circuit and a power source, a thyratron including a cathode, anode, and control grid, first means for intermittently applying a triggering bias to said control grid to render the thyratron conductive, a transformer having a primary and secondary, said primary being connected to the thyratron anode for excitation upon conductivity of the thyratron, a device connected to said secondary for discharge of the voltage induced in said secondary, and second means in circuit with said first means adapted for voltage generation responsively to engine cylinder firing pressures for altering the normal rhythmic functioning of said first means in impressing a triggering bias on said control grid.

4. In an internal combustion engine firing system, a primary circuit and a power source, a thyratron in said circuit and including an anode, a cathode, and control grid, an induction coil having a primary and a secondary, said primary being connected to said anode for excitation on establishment of a plate current in said thyratron, a firing control device connected to said secondary for operation by voltage induced in said secondary, current generating means connected to said control grid for affecting the bias thereof, mechanical means adapted for action responsive to the engine cylinder firing pressure and associated with said current-generating means, whereby the current generated will bear a predetermined relation to the cylinder firing pressure.

5. In a firing control system for internal combustion engines, a primary circuit and a power source, a thyratron including a cathode, anode, and control grid, first means for intermittently applying a triggering bias to said control grid to render the thyratron conductive, a light sensitive device in circuit with said first means for influencing the impressed grid bias, and mechanical means for controlling the amount of light impinging on said light sensitive device in predetermined relation to engine firing pressures.

6. In a firing control system for internal combustion engines, a primary circuit and a power source, a thyratron including a cathode, anode, and control grid, a source of current connected to said control grid and adapted to intermittently impress a triggering bias thereon for rendering the thyratron conductive, a discharge device adapted for discharge on establishment of current through the thyratron, current generating means connected to said source of current for influencing the potential thereof, and means controlling the current generated by said current generating means in predetermined relationship to the engine cylinder firing pressure.

7. In a firing control system for internal combustion engines, a primary circuit and a power source, a thyratron including a cathode, anode, and control grid, first means for intermittently applying a triggering bias to said control grid to render the thyratron conductive, a light sensitive device in circuit with said first means for influencing the impressed grid bias, a pressure registering device connected to a cylinder of the engine for responsive action to the firing pressures therein, and means operative by said pressure registering device for controlling the amount of light impinging on said light sensitive device.

8. In a firing control system for internal combustion engines, a primary circuit and a power source, a thyratron including a cathode, anode, and control grid, first means for intermittently applying a triggering bias to said control grid to render the thyratron conductive, a light sensitive device in circuit with said first means for influencing the impressed grid bias, a pressure registering device connected to a cylinder of the engine for responsive action to the firing pressures therein, and a light intercepting member operatively engaged to said pressure registering device for movement thereby, said member having graduated translucency whereby the amount of light impinging on said light sensitive device will be in predetermined relation to the cylinder firing pressure.

9. In a firing control system for internal combustion engines, a primary circuit and a power source, a thyratron including a cathode, anode, and control grid, first means for intermittently applying a triggering bias to said control grid to render the thyratron conductive, a light sensitive device in circuit with said first means for influencing the impressed grid bias, a pressure registering device connected to a cylinder of the engine for responsive action to the firing pressures therein, valve means associated with said pressure registering device for reducing the pressures created therein to approximate cylinder average firing pressures, and means operative by said pressure registering device for controlling the amount of light impinging on said light sensitive device.

10. In a firing control system for internal combustion engines, a primary circuit and a power source, a thyratron in said circuit and including an anode, a cathode, and control grid, an induction coil having a primary and a secondary, said primary being connected to said anode for excitation on establishment of a plate current in said thyratron, a device connected to said secondary for discharge of voltage induced in said secondary, a light sensitive device in circuit with said control grid for affecting the bias thereof, and mechanical means for controlling the amount of light impinging on said light sensitive device in predetermined relation to engine cylinder firing pressures.

11. In a firing control system for internal combustion engines, a primary circuit and a power source, a thyratron in said circuit and including an anode, a cathode, and control gird, an induction coil having a primary and a secondary, said primary being connected to said anode for excitation on establishment of a plate current in said thyratron, a device connected to said secondary for discharge of voltage induced in said secondary, a light sensitive device in circuit with said control grid for affecting the bias thereof, a source of light for projection of light rays on said light sensitive device, mechanical means connected to the engine cylinder for action responsive to the firing pressures therein, and a light masking member interposed between said light source and light sensitive device for positioning responsive to action of said mechanical means, whereby the current generated by light sensitive device will be in predetermined relationship to the cylinder firing pressures.

12. In a firing control system for internal combustion engines, a primary circuit and a power source, a thyratron including a cathode, anode, and control grid, a source of current connected to said control grid and adapted to intermittently impress a triggering bias thereon for rendering the thyratron conductive, a discharge device adapted for discharge on establishment of current through the thyratron, mechanical pressure registering means connected to an engine cylinder for action responsive to the firing pressures therein, and electromechanical means coupling said mechanical pressure registering means and the control grid, said electromechanical means being adapted to influence the potential of said source of current.

13. In a firing control system for internal combustion engines, a primary circuit and a power source, a thyratron including a cathode, anode, and control grid, a source of current connected to said control grid and adapted to intermittently impress a triggering bias thereon for rendering the thyratron conductive, a discharge device adapted for discharge on establishment of current through the thyratron, a pressure registering device in communication with the combustion chamber of an engine cylinder and having a diaphragm for flexure responsive to the cylinder firing pressure, an electromechanical device operatively connected to said diaphragm for current generation responsive to the cylinder firing pressure, said electromechanical member being adapted to influence the potential of said source of current, whereby the timing of the discharge is controlled.

14. For use in an internal combustion engine having a fuel injector and fuel pump, and pump operating means, a firing control system comprising a primary circuit and a power source, a thyratron including a cathode, anode, and control grid, means for intermittently applying a positive bias to said control grid to render the thyratron conductive for establishment of a plate current therethrough, a discharge device adapted for discharge on current flow in the thyratron, fuel pump latch means operatively engaged to said discharge device for pump releasing movement on discharge through said device, and means for influencing the potential of said grid biasing means in predetermined relation to the firing pressures of the engine cylinder.

15. For use in an internal combustion engine having a fuel injector and fuel pump, and pump operating means, a firing control system comprising a primary circuit and a power source, a thyratron including a cathode, anode, and control grid, means for intermittently applying a triggering bias to said control grid to render the thyratron conductive for establishment of a plate current therethrough, a solenoid adapted for energization on current flow through the thyratron, an armature operatively associated with said solenoid and having a latch arm forming end, said latch arm normally engaging the pump piston to inhibit operation thereof and releasing said piston upon energization of said solenoid, and means for influencing the potential of said grid biasing means in predetermined relation to the firing pressure of the engine cylinder so that fuel injection will be timed thereby.

16. In an ignition control system, a primary circuit and a power source, a thyratron in said circuit and including an anode, a cathode, and control grid, an induction coil having a primary and a secondary, said primary being connected to said anode for excitation on establishment of a plate current in said thyratron, a device connected to said secondary for discharge of voltage induced in said secondary, a light sensitive device in circuit with said control grid for affecting the bias thereof, a source of light for projection of light rays on said light sensitive device, mechanical means connected to an engine cylinder for action responsive to the firing pressures therein, an opaque disc interposed between the light source and light sensitive device, being adapted for rotation in timed relation to the engine and having a radial opening, a screen member positionable in response to said mechanical means and having an opening alignable with the disc opening to permit light flow therethrough to activate the light sensitive device, whereby current will be generated in the latter in predetermined relationship to the cylinder firing pressures.

17. In a firing control system, a combination of elements as specified in claim 13 in which the electromechanical device includes a piezoelectric crystal.

18. In a firing control system, a combination of elements as specified in claim 13 in which the electromechanical device includes a variable capacitor.

References Cited in the file of this patent

UNITED STATES PATENTS

| | | |
|---|---|---|
| 1,873,175 | Arthur | Aug. 23, 1932 |
| 1,941,342 | Dyer | Dec. 26, 1933 |
| 2,084,267 | Hicks | June 15, 1937 |
| 2,169,818 | Scott | Aug. 15, 1939 |
| 2,248,574 | Knight | July 8, 1941 |
| 2,401,563 | Hersey | June 4, 1946 |
| 2,427,407 | Hill | Sept. 16, 1947 |
| 2,446,671 | Short et al. | Aug. 10, 1948 |
| 2,474,550 | Short | June 28, 1949 |
| 2,522,389 | Mason | Sept. 12, 1950 |